(12) United States Patent
Ohkoba et al.

(10) Patent No.: US 10,775,686 B2
(45) Date of Patent: Sep. 15, 2020

(54) WAVELENGTH CONVERSION ELEMENT, LIGHT SOURCE APPARATUS AND IMAGE PROJECTION APPARATUS

(71) Applicant: CANON KABUSHIKI KAISHA, Tokyo (JP)

(72) Inventors: Minoru Ohkoba, Utsunomiya (JP); Yuya Kurata, Utsunomiya (JP); Ryota Kadowaki, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 265 days.

(21) Appl. No.: 15/606,065

(22) Filed: May 26, 2017

(65) Prior Publication Data

US 2017/0343890 A1    Nov. 30, 2017

(30) Foreign Application Priority Data

May 31, 2016 (JP) .................................. 2016-108050
Feb. 7, 2017 (JP) .................................. 2017-020127

(51) Int. Cl.
*G03B 21/20* (2006.01)
*F21V 9/30* (2018.01)
*G02B 5/02* (2006.01)

(52) U.S. Cl.
CPC .............. *G03B 21/204* (2013.01); *F21V 9/30* (2018.02); *G02B 5/0242* (2013.01)

(58) Field of Classification Search
CPC ....... G03B 21/204; F21V 9/30; G02B 5/0242; F21Y 2115/10; F21K 9/64; H01L 2924/0002

(Continued)

(56) References Cited

U.S. PATENT DOCUMENTS

2006/0255716 A1   11/2006   Tsutsumi et al.
2007/0041191 A1   2/2007    Okada
(Continued)

FOREIGN PATENT DOCUMENTS

CN    102800791 A    11/2012
JP    2010256480 A   11/2010
(Continued)

OTHER PUBLICATIONS

Search and Examination Report under Sections 17 and 18(3) issued in Great Britain Appln. No. 1708667.9 dated Oct. 1, 2018.
(Continued)

*Primary Examiner* — Cara E Rakowski
*Assistant Examiner* — Jessica M Apenteng
(74) *Attorney, Agent, or Firm* — Rossi, Kimms & McDowell LLP

(57) ABSTRACT

The wavelength conversion element converts a wavelength of part of an exciting light to generate a fluorescent light and thereby generate a combined light in which the fluorescent light is combined with a non-converted light whose wavelength is the same as that of the exciting light. The element includes a fluorescent body, a binder contacting the fluorescent body, and multiple diffuser particles included in the binder. A minimum particle diameter of the multiple diffuser particles is ¼ or more and 4 times or less of a wavelength of the fluorescent light, and a ratio of a volume of the multiple diffuser particles to a total volume of the binder and multiple diffuser particles is 25% or more and 50% or less.

13 Claims, 3 Drawing Sheets

(58) Field of Classification Search
USPC .......................................................... 362/84
See application file for complete search history.

(56) References Cited

U.S. PATENT DOCUMENTS

| | | |
|---|---|---|
| 2015/0077966 A1 | 3/2015 | Bessho |
| 2015/0171372 A1 | 6/2015 | Iwata |
| 2015/0187998 A1 | 7/2015 | Lin et al. |
| 2015/0333233 A1* | 11/2015 | Washizu ............... H01L 33/505 257/98 |
| 2016/0102818 A1 | 4/2016 | Chu |
| 2016/0102819 A1 | 4/2016 | Misawa et al. |

FOREIGN PATENT DOCUMENTS

| | | |
|---|---|---|
| JP | 2011071404 A | 4/2011 |
| JP | 2011155125 A | 8/2011 |
| JP | 2011180353 A | 9/2011 |
| JP | 2012108435 A | 6/2012 |
| JP | 2014229503 A | 12/2014 |
| JP | 2015089898 A | 5/2015 |
| JP | 2015121763 A | 7/2015 |
| JP | 2016015523 A | 1/2016 |
| WO | 2014006987 A1 | 1/2014 |
| WO | 2015068338 A1 | 5/2015 |
| WO | 2016121855 A1 | 8/2016 |

OTHER PUBLICATIONS

Combined Search and Examination Report under Sections 17 and 18(3) issued in Great Britain Appln. No. 1708667.9 dated Nov. 29, 2017.
Office Action issued in Chinese Appln. No. 201710375972.2 dated Feb. 6, 2020. English translation provided.
Office Action issued in Japanese Appln. No. 2017-020127 dated Oct. 29, 2019. English translation provided.
Preliminary Search Report issued in French Application No. 1754666 dated Sep. 17, 2019. English translation provided.

* cited by examiner

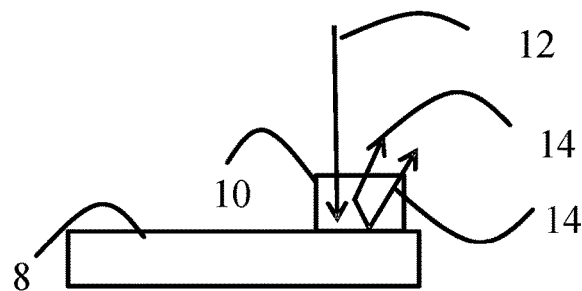
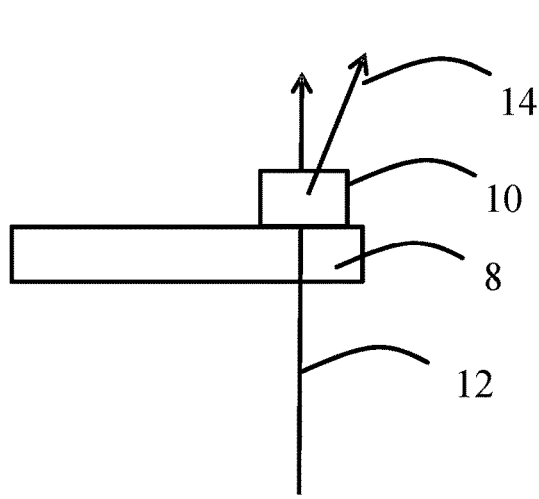
FIG. 3A    FIG. 3B
| | PARTICLE DIAMETER [um] | |
|---|---|---|
| DIFFUSER VOLUME CONCENTRATION[%] | 1 | 3 |
| 20% | × | × |
| 30% | ○ | × |
| 40% | ○ | × |
| 60% | × | × |
| | A | B |
TOO HIGH VISCOSITY
DIFFUSER
FIG. 4

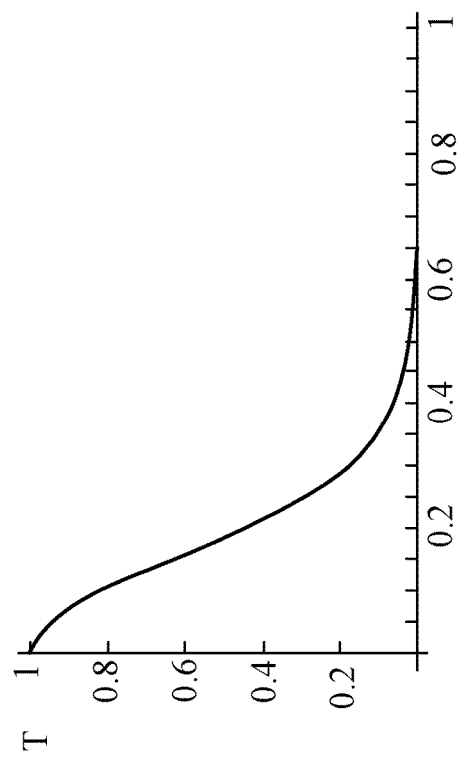
FIG. 5
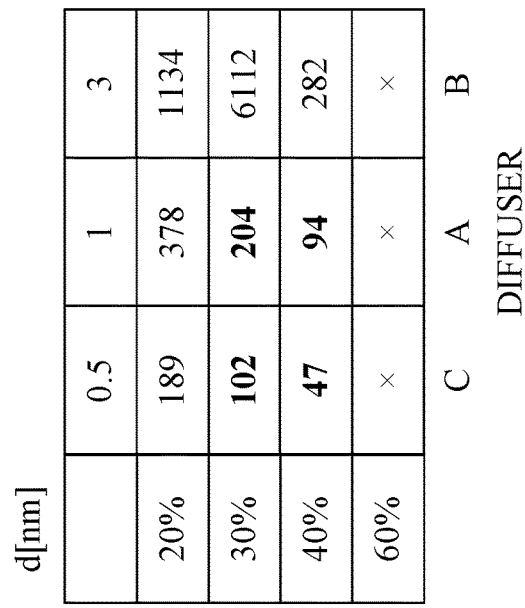
FIG. 6
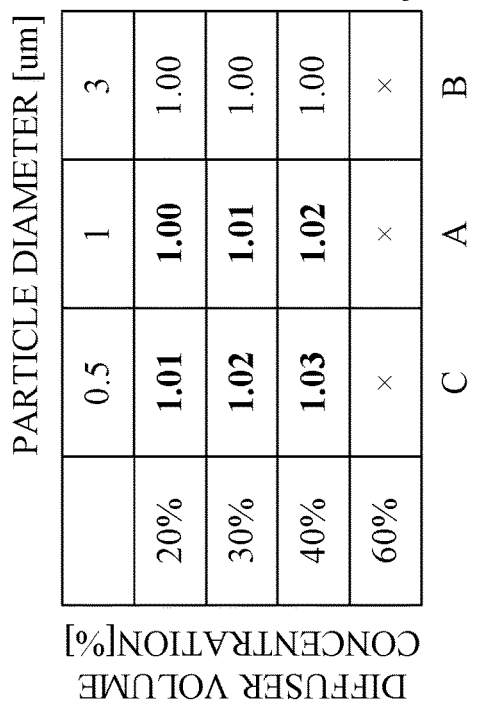

WAVELENGTH CONVERSION ELEMENT, LIGHT SOURCE APPARATUS AND IMAGE PROJECTION APPARATUS

BACKGROUND OF THE INVENTION

Field of the Invention

The present invention relates to a wavelength conversion element configured to convert a wavelength of an exciting light to generate a fluorescent light, and particularly to a wavelength conversion element suitable to be used for a light source apparatus for an image projection apparatus (projector).

Description of the Related Art

Wavelength conversion elements or light source apparatuses include one that converts part of an exciting light such as a laser light to generate a fluorescent light whose wavelength (that is, color) is different from that of the exciting light and generates a combined light in which the fluorescent light is combined with a non-converted light that is a light whose wavelength is not converted by a fluorescent body (phosphor) and thereby is the same as that of the exciting light. Of the exciting light, the non-converted light is a light that is diffused (reflected) by diffuser particles without reaching the fluorescent body.

Japanese Patent Laid-Open No. 2011-180353 discloses a wavelength conversion element whose wavelength conversion efficiency is improved so as to enhance heat radiation from its fluorescent body, by adding fillers (minute particles) as diffusers whose heat conductivity is high to the fluorescent body and a resin for holding the fluorescent body. On the other hand, Japanese Patent Laid-Open No. 2015-089898 discloses a wavelength conversion element whose fluorescent light extraction efficiency from fluorescent body particles is improved by adhering inorganic oxide particles to the fluorescent body particles.

However, in the wavelength conversion element disclosed in Japanese Patent Laid-Open No. 2011-180353, the resin encloses the high heat conductivity particles (fillers), and therefore it is difficult to provide, by only using the wavelength conversion element, an effect of increasing the heat conductivity so as to cool the fluorescent body. Thus, it is difficult to expect a luminance improving effect in a light source apparatus using this wavelength conversion element.

On the other hand, although the wavelength conversion element disclosed in Japanese Patent Laid-Open No. 2015-089898 can improve in principle the fluorescent light extraction efficiency, in actual the inorganic oxide particles separate away from the fluorescent body particles in a mixing process for uniformly mixing the fluorescent body particles to which the inorganic oxide particles are adhered into the resin (binder). Furthermore, even if the inorganic oxide particles do not separate away from the fluorescent body particles, air bubbles are caught between these particles.

In this case, the luminance improving effect becomes low.

SUMMARY OF THE INVENTION

The present invention provides a wavelength conversion element capable of improving fluorescent light extraction efficiency, that is, fluorescent light emission efficiency, compared with conventional ones while having a simple structure. The present invention further provides a light source apparatus using the above wavelength conversion element and provides an image projection apparatus using the light source apparatus.

The present invention provides as an aspect thereof a wavelength conversion element configured to convert a wavelength of part of an exciting light to generate a fluorescent light and thereby generate a combined light in which the fluorescent light is combined with a non-converted light whose wavelength is the same as that of the exciting light. The wavelength conversion element includes a fluorescent body, a binder contacting the fluorescent body, and multiple diffuser particles included in the binder. A minimum particle diameter of the multiple diffuser particles is ¼ or more and 4 times or less of a wavelength of the fluorescent light, and a ratio of a volume of the multiple diffuser particles to a total volume of the binder and multiple diffuser particles is 25% or more and 50% or less.

The present invention provides as another aspect thereof a wavelength conversion element configured to convert a wavelength of part of a blue light as an exciting light to generate a yellow light as a fluorescent light and thereby generate a combined light in which the yellow light is combined with the blue light. The wavelength conversion element includes a fluorescent body, a binder contacting the fluorescent body, and multiple diffuser particles included in the binder. When D represents a minimum particle diameter of the multiple diffuser particles, X represents a ratio of a volume of the multiple diffuser particles to a total volume of the binder and multiple diffuser particles, and d is defined as:

$$d = \left\{ \left( \frac{\pi}{6} \frac{1}{X} \right)^{\frac{1}{3}} - 1 \right\} \cdot D,$$

d is 600 nm or less.

The present invention provides as still another aspect thereof a light source apparatus and an image projection apparatus each using the above wavelength conversion element.

Further features of the present invention will become apparent from the following description of exemplary embodiments with reference to the attached drawings.

BRIEF DESCRIPTION OF THE DRAWINGS

FIG. 3A illustrates a transmissive fluorescent body layer.

FIG. 3B illustrates a reflective fluorescent body layer.

FIG. 4 illustrates presence or absence of an effect of improving fluorescent light emission efficiency in Embodiment 1.

FIG. 5 illustrates an optical tunneling effect in Embodiment 1.

FIG. 6 illustrates presence or absence of an effect of improving fluorescent light emission efficiency in Embodiment 2.

DESCRIPTION OF THE EMBODIMENTS

Exemplary embodiments of the present invention will be described below with reference to the accompanied drawings.

As the above-described wavelength conversion element disclosed in Japanese Patent Laid-Open No. 2015-089898, adhering minute particles such as inorganic oxide particles to surfaces of the fluorescent body is effective for extracting a light having conventionally been absorbed in the fluorescent body. However, even when the minute particles are not adhered to the fluorescent body, that is, even when the minute particles (diffuser particles in this embodiment) are separate from the fluorescent body, a fluorescent light can be extracted from inside the fluorescent body as follows.

The fluorescent light existing inside the fluorescent body and being internally totally reflected at its surface once leaks (exudes) outside the fluorescent body as an evanescent light at a vicinity of that surface. It is necessary to extract this evanescent light before it returns into the fluorescent body. In other words, disposing the minute particles at the vicinity of the surface of the fluorescent body to capture the evanescent light before it returns into the fluorescent body and change its propagating direction reduces a light not exiting outside the fluorescent body because of the internal total reflection at the surface of the fluorescent body.

This enables improving fluorescent light extraction efficiency.

Figure 1:
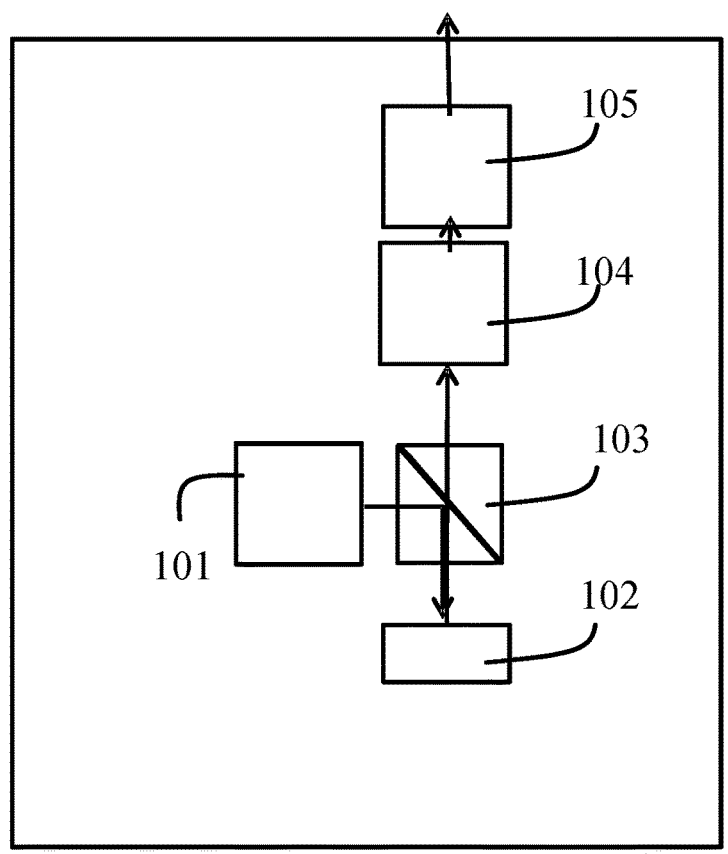
FIG. 1 illustrates a configuration of a projector using a wavelength conversion element that is an embodiment of the present invention.

FIG. 1 illustrates a configuration of an image projection apparatus (projector) 200 using a wavelength conversion element that will be described in each of specific embodiments of the present invention.

The projector 200 includes a blue laser diode (LD) 101 as a light source, and the wavelength conversion element 102. The projector 103 further includes a dichroic mirror 103, a panel unit 104 including a color separation and combination optical system and a liquid crystal element as a light modulation element, and a projection lens 105. The light modulation element may be a digital micromirror device. A blue laser (blue light) emitted from the blue LD 101 is reflected by the dichroic mirror 103 to be projected to the wavelength conversion element 102 as an exciting light. The wavelength conversion element 102 includes a substrate (not illustrated), and a fluorescent body layer (phosphor layer) formed on the substrate. The fluorescent body layer converts a wavelength of part of the exciting light to generate a yellow light as a fluorescent light and generates a white light as a combined light in which the yellow light is combined with a blue light as a non-converted light whose wavelength is the same as that of the exciting light. The blue LD 101 and the wavelength conversion element 102 constitute a light source apparatus. The light source apparatus may include the dichroic mirror 103.

The white light is transmitted through the dichroic mirror 103 or passes through outside the dichroic mirror 103 and then enters the panel unit 104.

The color separation and combination optical system in the panel unit 104 separates the white light into three color (R, G and B) lights to introduce the respective three color lights to corresponding liquid crystal panels. The three color lights image-modulated by the liquid crystal panels are mutually combined by the color separation and combination optical system and are projected through the projection lens 105 onto a projection surface (not illustrated) such as a screen.

Thereby, a color image as a projected image is displayed.

Figure 2A:
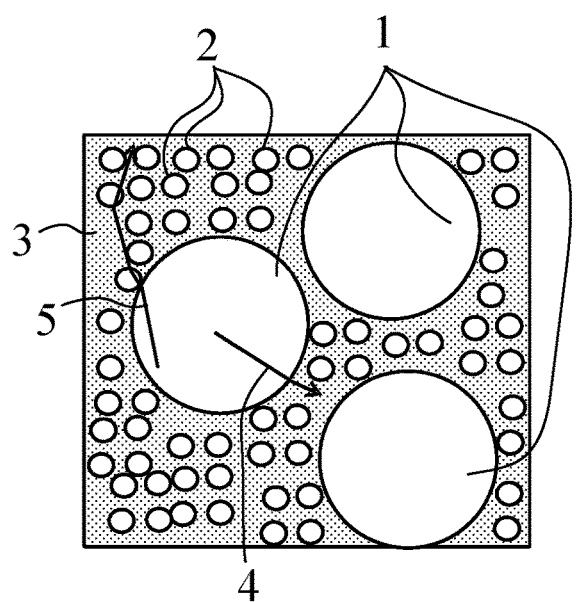
FIG. 2A illustrates a fluorescent body layer in the wavelength conversion element of the embodiment.
Figure 2B:
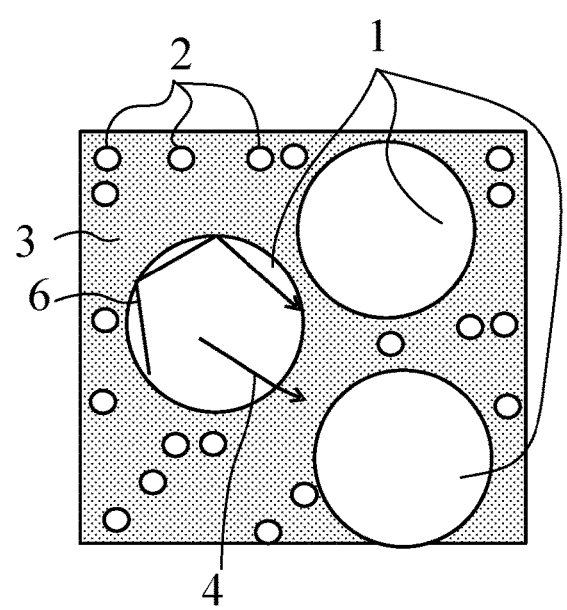
FIG. 2B illustrates a fluorescent body layer in a wavelength conversion element that is a conventional example.

FIG. 2A illustrates a structure of the fluorescent body layer provided in the wavelength conversion element 102 in this embodiment. FIG. 2B illustrates a structure of a fluorescent body layer as a comparative example with respect to this embodiment. The fluorescent body layer includes multiple fluorescent body particles 1 and multiple diffuser particles 2. In FIGS. 2A and 2b, the diffuser particles 2 are smaller in diameter than those of the fluorescent body particles 1. The fluorescent body layer further includes a binder 3 containing the fluorescent body particles 1 and the diffuser particles 2. Arrows 4, 5 and 6 indicate optical paths of fluorescent lights.

First, description will be made of a principle of extracting the fluorescent light from the fluorescent body particle 1 in this embodiment. The comparative example of FIG. 2B indicates a case that a concentration of the diffuser particles 2 in the binder 3 is lower than that in this embodiment. In this case, the fluorescent light generated inside the fluorescent body particle 1 includes a light reaching a surface of the fluorescent body particle 1 at a near right angle to exit outside the fluorescent body particle 1 as indicated by the optical path 4, and a light reaching an particle interface at a shallower angle than the near right angle to be internally totally reflected thereat and thereby stay inside the fluorescent body particle 1 (that is, a light absorbed by fluorescent body particle 1) as indicated by the optical path 6. The fluorescent light generated inside the fluorescent body particle 1 further includes a light reaching the particle interface at an intermediate angle between the angles of the optical paths 4 and 6. Part of this intermediate angle light exits outside the fluorescent body particle 1 and a remaining part thereof is absorbed by the fluorescent body particle 1, depending on transmittance and reflectance corresponding to that intermediate angel. The fluorescent light absorbed by the fluorescent body particle 1 is directly converted into heat. This causes loss of the fluorescent light, that is, reduces the fluorescent light extraction efficiency.

This embodiment illustrated in FIG. 2A increases the concentration of the fluorescent body particles 1 such that a later-described condition is satisfied, and thereby averagely arranges the diffuser particles 2 in the vicinity of each of the fluorescent body particles 1. Such an arrangement of the diffuser particles 2 provides an optical tunneling effect. As indicated by the optical path 5, the optical tunneling effect causes the fluorescent light reaching the particle interface at the shallower angle, which is originally internally totally reflected in the fluorescent body particle 1, to propagate to the diffuser particles 2 existing in the vicinity of this fluorescent body particle 1. Extracting thus the fluorescent light from the fluorescent body particle 1 through the diffuser particles 2 existing in the vicinity of that fluorescent body particle 1 enables improving the fluorescent light extraction efficiency from the wavelength conversion element 102, in other words, fluorescent light emission efficiency of the wavelength conversion element 102.

Next, description will be made of the fluorescent body particle 1 (hereinafter simply referred to as "a fluorescent body"), the diffuser particle 2 (hereinafter simply referred to as "a diffuser"), the binder 3 and the substrate (illustrated in FIGS. 3A and 3B) of the wavelength conversion element 102 in this embodiment.

<Fluorescent Body>

As the fluorescent body, any material may be used as long as it has a property that converts a wavelength of an exciting light to generate a fluorescent light. Typically, an inorganic material is used that is excited by a blue light whose wavelength is from approximately 440 nm to approximately 470 nm. This embodiment also can use this material. For example, as a fluorescent body that generates a yellow fluorescent light like the wavelength conversion element 102 illustrated in FIG. 1, $Y_3Al_5O_{12}:Ce^{3+}$, $(Sr,Ba)_2SiO_4:Eu^{2+}$, $Ca_x(Si,Al)_{12}(O,N)_{16}:Eu^{2+}$ can be used. $Ca_x(Si,Al)_{12}(O,N)_{16}:Eu^{2+}$ is generally called an α-Sialon fluorescent body and generates a fluorescent light from yellow to orange. As a fluorescent body that generates a red fluorescent light, CaAlSiN3:Eu2+, (Ca,Sr)AlSiN3:Eu2+, Ca2Si5N8:Eu2+, (Ca,Sr)2Si5N8:Eu2+, KSiF6:Mn4+, and KTiF6:Mn4+ can be used. As a fluorescent body that generates a green fluorescent light, Lu3Al5O12:Ce3+, (Lu,Y)3Al5O12:Ce3+, Y3(Ga,Al)5O12:Ce3+, Ca3Sc2Si3O12:Ce3+, CaSc2O4:Eu2+, (Ba,Sr)2SiO4:Eu2+, Ba3Si6O12N2:Eu2+, (Si,Al)6(O,N)8:Eu2+, and Sr4Al14O25:Eu2+ can be used.

As particles of the fluorescent body (fluorescent bodies), ones whose particle diameters are 1 µm or more and 100 µm or less are often used. This embodiment also can use fluorescent body particles having such diameters. This embodiment further can use nano fluorescent body particles whose particle diameters are 1 µm or less. Using such fluorescent body particles can improve the fluorescent light emission efficiency. However, it is desirable that an average (mean) particle diameter of the fluorescent bodies be larger than that of particles of the diffuser (diffusers) described below.

This embodiment uses in describing particle sizes "a particle diameter", "an average particle diameter", and "a minimum particle diameter". The particle diameter is a diameter of a sphere having the same volume as that of the particle. The average particle diameter is an average value of minimum and maximum particle diameters of all particles. When a variation (standard deviation) in particle diameters of all the particles is $\sigma$, the minimum particle diameter may be "the average particle diameter$-3\sigma$", and the maximum particle diameter may be "the average particle diameter$+3\sigma$". The minimum and maximum particle diameters can be statistically estimated without measurement of the particle diameters of all the particles.

It is desirable that the fluorescent body have, for the wavelength of the fluorescent light, a refractive index from 1.7 or more and 2.0 or less.

<Diffuser>

As the diffusers, particles (powders) having a low absorptance for visible light and light-transmissivity such as optical glass, barium sulfate, $TiO_2$, $Al_2O_3$, and diamond are used. This embodiment also can use these materials. The optical glass may be used with consideration of a refractive index of the diffuser. For example, an optical glass having a refractive index between those of the fluorescent body and the binder, such as FS5 (refractive index is 1.675) and FS15 (refractive index is 1.698) may be used. A barium sulfate having such a refractive index may be used.

It is desirable that the minimum particle diameter of the diffusers be ¼ or more and 4 times or less of the wavelength of the fluorescent light. Using diffusers whose minimum particle diameters are not within this range cannot sufficiently extract the fluorescent light from the fluorescent body. This makes it impossible to improve the fluorescent light emission efficiency. For example, when the fluorescent light is a yellow light, it is desirable that the minimum particle diameter of the diffusers be 2 µm or less, and that the average particle diameter of the diffusers be 0.1 µm or more and 5 µm or less.

<Binder>

The binder is used for fixing the fluorescent bodies and the diffusers. The binder may be selected from organic binders and inorganic binders. Each of the organic and inorganic binders is used as a binding material for treating the fluorescent body as a lump. The binder is used, when the substrate is used, as a material for fixing the fluorescent bodies and the diffusers to the substrate. When the substrate is not used, the binder is a binding material for solidifying the fluorescent body layer. As the organic binder, from a standpoint of heat resistance, silicone resin and epoxy resin are often used. The inorganic binders include heat resistant ceramic adhesive materials such as low-melting-point glass frit and ARON CERAMIC® made by Toagosei, Co., Ltd. The low-melting-point glass frit, which is resistant to air bubbles and volume shrinkage, is often used. This embodiment also can use these binders.

It is desirable that the binder have, for the wavelength of the fluorescent light, a refractive index from 1.4 or more and 1.6 or less. Furthermore, it is desirable that the diffuser have a refractive index between those of the fluorescent body and the binder.

It is desirable that the refractive indices of the fluorescent body and the diffuser have a difference of 0.3 or less. It is desirable that the refractive indices of the binder and the diffuser have a difference of 0.1 or more. In addition, it is desirable that a total thickness of the binder (that is, the fluorescent body layer) including the fluorescent bodies and the diffusers be 50 µm or more and 200 µm or less.

<Substrate>

This embodiment may use the substrate for fixedly supporting the fluorescent body layer. FIGS. 3A and 3B each illustrate a relation between a fluorescent body layer 10 and a substrate 8. FIGS. 3A and 3B each further illustrate an exciting light 12 and a fluorescent light 14. FIG. 3A illustrates a transmissive type in which the exciting light 12 enters the substrate 8 having light-transmissivity from its back (lower) face and is transmitted therethrough to be projected to the fluorescent body layer 10 provided on a front (upper) face of the substrate 8 and thereby the fluorescent light 14 is extracted. In this transmissive type, from a standpoint of radiation of heat generated in the fluorescent body, it is desirable to use, as the substrate 8, one made of a material having light-transmissivity and a high heat conductivity, such as diamond and sapphire.

FIG. 3B illustrates a reflective type in which the exciting light 12 is projected to the fluorescent body layer 10 from an opposite side to the substrate 8 and in which the fluorescent light 14 directly emitted to the opposite side to the substrate and the fluorescent light 14 reflected by the substrate 8 and then emitted to the opposite side to the substrate 8 are extracted. In this reflective type, it is desirable to use, as the substrate 8, one made of a metal or the like reflecting a visible light without transmitting it, and especially, it is desirable to use a material having a high heat conductivity, such as Al, Cu and graphite.

<Concentration and Particle Diameter of Diffusers>

In order to improve the above-described fluorescent light emission (extraction) efficiency, it is necessary to dispose the diffusers close to the fluorescent body such that distances therebetween become a specific distance. In the following description, in a cube a remaining space other than a space where the fluorescent body is disposed is filled with the binder and the diffusers, the minimum particle diameter of the diffusers is represented by D, and distances between the diffusers are represented by d. The distance between the fluorescent body and the diffuser can be regarded as being equal to the distance d between the diffusers. Therefore, the distance d between the fluorescent body and the diffuser can be expressed as below.

A volume (unit volume) V of the above-described remaining space can be expressed as:

$$V=(D+d)^3.$$

Furthermore, a volume of all the diffusers can be expressed as:

$$Vd = \frac{4}{3}\pi\left(\frac{D}{2}\right)^3.$$

Thus, a ratio of the volume of all the diffusers to a total volume of all the diffusers and the binder, that is, a concentration X of the diffusers can be expressed as:

$$X = \frac{Vd}{V} = \frac{1}{(D+d)^3} \cdot \frac{4}{3}\pi\left(\frac{D}{2}\right)^3 = \frac{\pi}{6}\frac{D^3}{(D+d)^3}.$$

As a result, the distance d can be expressed as follows by using the concentration X and the minimum particle diameter D of the diffusers.

$$d = \left\{\left(\frac{\pi}{6}\frac{1}{X}\right)^{\frac{1}{3}} - 1\right\} \cdot D \quad (1)$$

The distance d at which the fluorescent light extraction efficiency is improved is closely related to the concentration of the diffusers. When the exciting light is a blue light and the fluorescent light is a yellow light, a distance d of 600 nm or less improves the fluorescent light extraction efficiency. For example, when diffusers A and C, which will be later described in Embodiments 1 and 2, are used, a concentration (expressed as percentages) X of 25% or more provides the distance d of 600 nm or less.

A distance d of 500 nm or less further improves the fluorescent light extraction efficiency, and a distance d of 300 nm or less still further improves the fluorescent light extraction efficiency.

Next, description will be made of specific embodiments (experimental examples). In the following description, the concentration X is expressed as percentages.

Embodiment 1

FIG. 4 illustrates a relation between concentrations (%) of the diffusers and fluorescent light emission (extraction) efficiencies in a first embodiment (Embodiment 1). This embodiment used YAG:Eu fluorescent body. The fluorescent bodies had an average particle diameter of 10 μm and a minimum diameter of 5 μm. The substrate was made of Al and had a thickness of 1 mm. The diffusers were made of barium sulfate. The diffusers included two types of diffusers that were diffusers A whose average and minimum particle diameters were respectively 2 μm and 1 μm and diffusers B whose average and minimum particle diameters were respectively 6 μm and 3 μm. The concentrations of the diffusers were set to 20%, 30%, 40%, and 60%. The binder was made of an epoxy resin made by Shin-Etsu Chemical Co., Ltd.

This embodiment mixed, with the diffusers and binder whose total volume is 1, the fluorescent bodies whose volume ratio is 0.5 to produce a paste, performed stirring and deforming on the paste, printed the stirred paste on the Al substrate and then hardened the printed paste by an oven at 200° C.

This embodiment evaluated a sample of the fluorescent body layer thus produced, by using a blue laser whose wavelength is 455 nm as the exciting light.

This embodiment used, as a laser light source, a blue LD made by Nichia Co., Ltd. Projecting the blue laser to the fluorescent body layer at an irradiation intensity of 30 W/mm² resulted a yellow fluorescent light emission efficiency illustrated in FIG. 4.

The diffusers A whose concentrations were 30% and 40% provided an effect of improving the fluorescent light emission efficiency, and on the other hand, the diffusers A whose concentrations were 20% and 60% did not provide such an effect. Furthermore, when the concentration was 60%, a high ratio of solids in the paste made it difficult to put a single layer paste on the substrate and made it impossible to planarize an irregular surface of the paste by leveling or the like in a production process. This increased surface reflection and thereby reduced the fluorescent light emission efficiency.

The minimum particle diameter 1 μm of the diffusers A is ¼ or more and 4 times or less of the wavelength of the yellow fluorescent light. On the other hand, using the diffusers B whose minimum particle diameter 3 μm is larger than 4 times of the wavelength of the yellow fluorescent light did not improve the fluorescent light emission efficiency regardless of the concentration thereof. Accordingly, the effect of improving the fluorescent light emission efficiency is provided when the minimum particle diameter the diffusers is ¼ or more and 4 times or less of the wavelength of the fluorescent light and the ratio (concentration) of the volume of all the diffusers to the total volume of all the diffusers and the binder is 25% or more and 50% or less.

The above condition that the minimum particle diameter the diffusers is ¼ or more and 4 times or less of the wavelength of the fluorescent light and the ratio of the volume of all the diffusers to the total volume of all the diffusers and the binder is 25% or more and 50% or less is applicable to cases other than that where the exciting light is the blue light and the fluorescent light is the yellow light.

When the minimum and average particle diameters of the diffusers A are respectively 1 μm and 2 μm and the concentration thereof is 30%, the above expression (1) provides, as the distance d(=d0), 407 nm.

In this embodiment, a light transmittance T of the fluorescent body layer is changed by a typical optical tunneling effect as illustrated in FIG. 5. As illustrated in FIG. 5, the optical tunneling effect significantly appears when d/λ is 0.5. The wavelength (or a dominant wavelength) of the fluorescent light is approximately 550 nm, so that the distance d is approximately 275 nm when d/λ is 0.5.

When an actual cross-section SEM image of the fluorescent body layer sample is observed, all mutually adjacent diffuser particles are not located at equal intervals, but are located at various intervals from d0/2 to 2d0. From this fact, d0/2 can be regarded as being almost equal to d and thereby d0/2d is 204 nm, so that it is understood that the distance d calculated by the expression (1) provides the effect of improving the fluorescent light emission efficiency.

Embodiment 2

FIG. 6 illustrates in its left part a relation between concentrations (%) of the diffusers and fluorescent light emission efficiencies in a second embodiment (Embodiment 2). This embodiment used, in addition to the diffusers A and B described in Embodiment 1, diffusers C whose minimum and average particle diameters are respectively 0.5 μm and 1 μm. Bold letters in FIG. 6 indicate a range where the fluorescent light emission efficiencies were improved by 1% or more. This range is one where, as illustrated in a right part of FIG. 6, the distance d calculated by the expression (1) is 300 nm or less.

Embodiment 3

A third embodiment (Embodiment 3) changed a ratio of the volume of all the fluorescent bodies to a total volume of all the fluorescent bodies and the diffusers in a range from 0.5 to 1.5, specifically to 0.5, 0.75, 1, 1.25, and 1.5. Changing the ratio enabled adjusting a light amount ratio between the non-converted light and the fluorescent light that are emitted from the fluorescent body layer. This adjustment enabled providing a white light with a good chromaticity.

Embodiment 4

A fourth embodiment (Embodiment 4) used a binder made of a low-melting-point glass. In this case, the binder did not change into a low-viscosity state, which is different from silicone resin and epoxy resin, so that it was easy to uniformly disperse the fluorescent bodies and the diffusers into the binder and thereby it was possible to produce a fluorescent body layer whose fluorescent light emission efficiency is high.

Embodiment 5

A fifth embodiment (Embodiment 5) used diffusers whose average particle diameter is 0.1 µm or more and 5 µm or less. The diffusers in this embodiment provided a good light diffusivity and the effect of improving the fluorescent light emission efficiency.

Embodiment 6

A sixth embodiment (Embodiment 6) used, as a material of the fluorescent bodies, a YAG-Ce whose refractive index is 1.82, and used, as a material of the binder, a silicone resin whose refractive index is 1.43. Furthermore, this embodiment used, as a material of the diffusers, a barium sulfate whose refractive index is 1.64. Selecting these materials enabled producing the fluorescent body layer capable of emitting a light whose absolute luminance value is higher than that in Embodiment 1 by 20%.

Embodiment 7

A seventh embodiment (Embodiment 7) produced a wheel-shaped (or annular or discal) fluorescent body layer in which the fluorescent bodies, the diffusers and the binder are mutually mixed at equal volume ratios. This embodiment rotated this fluorescent body layer circumferentially and projected the exciting light to a circumferential part of the rotated fluorescent body layer. This enabled causing light from the fluorescent body layer while reducing changes of luminance and color thereof due to heat generated in the fluorescent body layer. Specifically, using the wheel-shaped fluorescent body layer whose thickness is 100 µm and whose diameter is 10 cm enabled reducing luminance variation to approximately 3%. On the other hand, a case of using a fluorescent body layer including no diffusers and a case of using a fluorescent body layer including two layers in which one layer is formed by mixing the diffusers with the binder and the other layer is formed by mixing the fluorescent bodies with the binder caused a luminance variation of approximately 12%.

Embodiment 8

An eighth embodiment (Embodiment 8) produced the fluorescent body layer by mixing the fluorescent bodies and the diffusers with the binder and by putting (printing) the mixture on the substrate. This production method needs only one printing process and thereby reduces cost for producing the fluorescent body layer, compared with a case of separately putting a mixture of the fluorescent bodies and the binder and a mixture of the diffusers and the binder.

Embodiment 9

A ninth embodiment (Embodiment 9) produced, on a polycrystalline fluorescent body (plate-shaped fluorescent body), the fluorescent body layer (mixture of the diffusers and the silicone resin binder) whose concentration of the diffusers is one of those described in Embodiments 1 and 2. This embodiment improved the fluorescent light emission efficiency by 4%, compared with a case of putting a silicone resin binder including no diffusers on the polycrystalline fluorescent body. A similar result was obtained in a case of using a single-crystalline fluorescent body, instead of the polycrystalline fluorescent body.

As described above, each of Embodiments 1 to enabled providing a wavelength conversion element whose structure is simple and whose fluorescent light emission efficiency is high. Thus, using this wavelength conversion element enables providing a light source apparatus whose luminance is higher than conventional ones and providing a projector capable of projecting images brighter than conventional ones.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2016-108050, filed on May 31, 2016 and 2017-020127, filed on Feb. 7, 2017, which are hereby incorporated by reference herein in their entirety.

What is claimed is:

1. A wavelength conversion element configured to generate a fluorescent light by converting a wavelength of an incident light, the wavelength conversion element comprising:
   multiple fluorescent particles;
   multiple diffuser particles; and
   a binder in which the multiple fluorescent particles and the multiple diffuser particles are dispersed,
   wherein:
   a minimum particle diameter of the multiple diffuser particles is ¼ or more and 4 times or less of a wavelength of the fluorescent light;
   a ratio of a volume of the multiple diffuser particles to a total volume of the binder and multiple diffuser particles is 25% or more and 50% or less;
   the fluorescent particle has, for a wavelength of the fluorescent light, a refractive index of 1.7 or more and 2.0 or less;
   the binder has, for a wavelength of the fluorescent light, a refractive index of 1.4 or more and 1.6 or less; and the diffuser particle has a refractive index between the refractive index of the fluorescent particle and the refractive index of the binder.

2. A wavelength conversion element according to claim 1, wherein a ratio of a volume of the multiple fluorescent particles to a volume of all the multiple diffuser particles is 0.5 or more and 1.5 or less.

3. A wavelength conversion element according to claim 1, wherein:
when an average value of a maximum particle diameter and a minimum particle diameter of particles is referred to as an average particle diameter, the multiple fluorescent particles have a larger average particle diameter than that of the multiple diffuser particles.

4. A wavelength conversion element according to claim 1, wherein the minimum particle diameter of the multiple diffuser particles is 2 μm or less.

5. A wavelength conversion element according to claim 1, wherein when an average value of a maximum particle diameter and a minimum particle diameter of particles is referred to as an average particle diameter, the multiple diffuser particles have an average particle diameter of 0.1 μm or more and 5 μm or less.

6. A wavelength conversion element according to claim 1, wherein the fluorescent particle and the diffuser particle have, for a wavelength of the fluorescent light, a refractive index difference of 0.3 or less.

7. A wavelength conversion element according to claim 1, wherein the binder and the diffuser particle have, for a wavelength of the fluorescent light, a refractive index difference of 0.1 or more.

8. A wavelength conversion element according to claim 1, wherein a total thickness of the binder including the multiple fluorescent particles and the multiple diffuser particles is 50 μm or more and 200 μm or less.

9. A wavelength conversion element according to claim 1, wherein the binder is disposed annularly or discally.

10. A wavelength conversion element configured to generate a fluorescent light by converting a wavelength of an incident light, the wavelength conversion element comprising:
multiple fluorescent particles;
multiple diffuser particles; and
a binder in which the multiple fluorescent particles and the multiple diffuser particles are dispersed,
wherein:
the fluorescent particle has, for a wavelength of the fluorescent light, a refractive index of 1.7 or more and 2.0 or less;
the binder has, for a wavelength of the fluorescent light, a refractive index of 1.4 or more and 1.6 or less;
the diffuser particle has a refractive index between the refractive index of the fluorescent particle and the refractive index of the binder; and
when D represents a minimum particle diameter of the multiple diffuser particles, X represents a ratio of a volume of the multiple diffuser particles to a total volume of the binder and multiple diffuser particles, and d is defined as:

$$d = \left\{ \left( \frac{\pi}{6} \frac{1}{X} \right)^{\frac{1}{3}} - 1 \right\} \cdot D,$$

d is 600 nm or less.

11. A wavelength conversion element according to claim 10, wherein d is 300 nm or less.

12. A light source apparatus comprising:
a light source configured to emit an exciting light; and
a wavelength conversion element configured to generate a fluorescent light by converting a wavelength of the exciting light,
wherein the wavelength conversion element comprises:
multiple fluorescent particles;
multiple diffuser particles; and
a binder in which the multiple fluorescent particles and the multiple diffuser particles are dispersed,
wherein:
a minimum particle diameter of the multiple diffuser particles is ¼ or more and 4 times or less of a wavelength of the fluorescent light;
a ratio of a volume of the multiple diffuser particles to a total volume of the binder and multiple diffuser particles is 25% or more and 50% or less;
the fluorescent particle has, for a wavelength of the fluorescent light, a refractive index of 1.7 or more and 2.0 or less;
the binder has, for a wavelength of the fluorescent light, a refractive index of 1.4 or more and 1.6 or less; and
the diffuser particle has a refractive index between the refractive index of the fluorescent particle and the refractive index of the binder.

13. An image projection apparatus comprising:
a light source configured to emit an exciting light;
a wavelength conversion element configured to generate a fluorescent light by converting a wavelength of the exciting light and thereby generate a combined light in which the fluorescent light is combined with the exciting light; and
an optical system configured to project an image using a light modulation element configured to modulate the combined light,
wherein the wavelength conversion element comprises:
multiple fluorescent particles;
multiple diffuser particles; and
a binder in which the multiple fluorescent particles and the multiple diffuser particles are dispersed,
wherein:
a minimum particle diameter of the multiple diffuser particles is ¼ or more and 4 times or less of a wavelength of the fluorescent light;
a ratio of a volume of the multiple diffuser particles to a total volume of the binder and multiple diffuser particles is 25% or more and 50% or less;
the fluorescent particle has, for a wavelength of the fluorescent light, a refractive index of 1.7 or more and 2.0 or less;
the binder has, for a wavelength of the fluorescent light, a refractive index of 1.4 or more and 1.6 or less; and
the diffuser particle has a refractive index between the refractive index of the fluorescent particle and the refractive index of the binder.

* * * * *